United States Patent

Oshio et al.

[11] Patent Number: 6,002,842
[45] Date of Patent: Dec. 14, 1999

[54] HALFTONE REPRESENTATION TAKING INTO ACCOUNT CHARACTERISTICS OF IMAGE AND PRINTER

[75] Inventors: Hiroshi Oshio; Kazuhiko Sato; Shigeru Ainai; Hiromitsu Horie; Takao Kamata, all of Kawasaki, Japan

[73] Assignee: Fujitsu Limited, Kawasaki, Japan

[21] Appl. No.: 08/908,461

[22] Filed: Aug. 7, 1997

[30] Foreign Application Priority Data

Feb. 13, 1997 [JP] Japan ..................................... 9-029456

[51] Int. Cl.⁶ ............................................. H04N 1/40
[52] U.S. Cl. .......................................... 395/109; 358/456
[58] Field of Search .................................... 395/101, 109; 358/455, 456, 457, 534, 535, 536

[56] References Cited

U.S. PATENT DOCUMENTS

| 4,578,713 | 3/1986 | Tsao et al. . | |
|---|---|---|---|
| 4,698,690 | 10/1987 | Tanioka . | |
| 4,962,433 | 10/1990 | Matsushima | 358/455 |
| 5,260,806 | 11/1993 | Samworth | 358/456 |

FOREIGN PATENT DOCUMENTS

| 0341666 | 11/1989 | European Pat. Off. . |
|---|---|---|
| 0415722 | 3/1991 | European Pat. Off. . |
| 0621723 | 10/1994 | European Pat. Off. . |
| 0629079 | 12/1994 | European Pat. Off. . |
| 0687102 | 12/1995 | European Pat. Off. . |
| 63-181568 | 7/1988 | Japan . |
| 1237142 | 9/1989 | Japan . |

*Primary Examiner*—Thomas D. Lee
*Attorney, Agent, or Firm*—Armstrong, Westerman, Hattori, McLeland, & Naughton

[57] ABSTRACT

A method of achieving halftone representation of image data by using a printer for printing the image data includes the steps of providing a plurality of tone curves which takes into consideration characteristics of the printer, and selecting a tone curve from the plurality of tone curves. The method further includes a step of printing the image data by using the selected tone curve.

15 Claims, 7 Drawing Sheets

———————— GENERAL IMAGE
- - - - - - - - - DARK IMAGE
— · — · — · — INTERMEDIATE IMAGE
— ·· — ·· — ·· — BRIGHT IMAGE

HALFTONE REPRESENTATION TAKING INTO ACCOUNT CHARACTERISTICS OF IMAGE AND PRINTER

BACKGROUND OF THE INVENTION

1. Field of the Invention

The present invention generally relates to methods of printing images by using printing devices, and particularly relates to a method of representing halftones of images by forming dots through area-based tone representation.

2. Description of the Prior Art

Printing devices which form letters and images by printing dots represent halftones by adjusting a ratio of a dot-occupied area to a unit area. For example, a square area of 8×8 dots or 16×16 dots is treated as one unit, and halftones are represented by adjusting the number of dots printed within this area. When deciding whether to print a dot at a given dot position within this area, a level of the input image data is compared with a threshold value allocated to the given dot.

When a binary-value printer is employed, for example, use of an 8-by-8 matrix can represent 64 halftones, and use of a 16-by-16 matrix can represent 256 halftones. In general, area-based halftone representation uses an M-by-N-dot matrix to represent M×N×(k−1)+1 halftones, wherein k is the number of levels which one dot can represent.

In halftone representation, a decision has to be made with respect to each level of image data as to how many dots are formed in which position of a matrix. A dither matrix is a typical example of a matrix which is used for making such a decision. By defining a dither matrix, a tone curve is created to define a relationship between levels of the input image data and print densities.

In general, it is preferable to set characteristics of a tone curve such that the tone curve can properly represent input images in accordance with characteristics of the input image. For example, a histogram of levels may be obtained with regard to image data, and a tone curve may be defined so as to have a greater dynamic range of halftone representation in levels in which a greater number of pixels are in existence. Such a tone curve can enhance printing characteristics. This technique is disclosed in Japanese Patent Laid-open Applications No.1-237142 and No.63-181568.

The technique of the above-cited references, however, has a problem in that the tone curve defined based on the input image data does not reflect characteristics of printing devices.

Printers generally form dots which have a diameter larger than a dot pitch, and a conventional setting is that the dot diameter is 1.4 times larger than the dot pitch. The use of this dot diameter ensures that adjacent dots are properly connected when a diagonal line is formed with a one-dot line width. If the dot diameter is equal to the dot pitch, a diagonal line appears as a dotted line, and small white gaps are created when all areas are supposed to be printed in black. In order to avoid these, the dot diameter is set so as to be slightly larger than 1.4 times the dot pitch.

Use of a dot diameter larger than the dot pitch creates a problem in halftone representation when printing devices are used.

When a 2-by-2 matrix is used for halftone representation, for example, three halftones can be represented between 0% and 100% of the tone, i.e., halftones of 25%, 50%, and 75% are represented. In order to represent the halftone of 25%, for example, one of the four dots is printed. If the dot diameter is 1.4 times as large as the dot pitch, however, forming one dot in an attempt to achieve an area ratio of a dotted area to the total matrix area being 0.25 will result in an area ratio of 0.385. By the same token, an intended area ratio of 50% will result in an area ratio of 0.77, and an intended area ratio of 75% will end up bringing about an area ratio of 1.02.

Accordingly, a tone curve needs to be defined by taking into consideration a dot diameter of a printing device when halftone representation is employed.

Further, the number of dots printed in halftone representation should be decided based on actually printed lightness. Lightness, which is a measure derived from sensitivity characteristics of human vision, is supposed to be 100 when a surface is a perfectly diffuse reflector, and is zero when there is no reflection. Ideally, white on a printed surface corresponds to lightness of 100, and black on the printed surface is equal to lightness of zero. In actual printing devices, however, white with no printed dot corresponds to lightness of a paper surface, and approximately correspond to lightness of 90. Further, black created by forming all the dots corresponds to lightness of the black ink, and is approximately equal to lightness of 20.

Accordingly, a tone curve needs to be defined by taking into consideration actual lightness on a surface printed by a printing device when halftone representation is employed.

Accordingly, there is a general need to represent halftone images by using a tone curve which takes into account characteristics of the images and characteristics of a printing device that employs area-based halftone representation based on formation of dots.

There is a more specific need to represent halftone images by using a tone curve which takes into account a dot diameter of a printing device that employs area-based halftone representation based on formation of dots.

There is another need to represent halftone images by using a tone curve which takes into account actual lightness generated by a printing device that employs area-based halftone representation based on formation of dots.

SUMMARY OF THE INVENTION

Accordingly, it is a general object of the present invention to provide a method and a device which can satisfy the needs described above.

It is another and more specific object of the present invention to provide a method and a device which can represent halftone images by using a tone curve that takes into account characteristics of the images and characteristics of the printing device.

In order to achieve the above objects according to the present invention, a method of achieving halftone representation of image data by using a printer for printing the image data includes the steps of providing a plurality of tone curves which takes into consideration characteristics of the printer, and selecting a tone curve from the plurality of tone curves. The method further includes a step of printing the image data by using the selected tone curve. The selection of the tone curve is made based on characteristics of the image data.

The method described above provides the plurality of tone curves which take into account the characteristics of the printer, and selects an appropriate tone curve from the plurality of tone curves based on the characteristics of the image data. This makes it possible to achieve optimum halftone representation, thereby producing printed images having a high quality. The same improved results are obtained by an equivalent device.

It is still another object of the present invention to provide a method and a device which can represent halftone images by using a tone curve that takes into account a dot diameter of the printing device.

In order to achieve the above object according to the present invention, the method described above further includes the steps of providing information about a number of printed dots with respect to each level of the image data, wherein the number of printed dots is determined based on how much area the printed dots printed by the printer occupies within a unit area of the halftone representation.

In this method, the number of printed dots for representing a desired image level is determined based on an actual area ratio, thereby taking into account overlapping of dots caused by a dot diameter which is larger than a dot pitch. This achieves a high quality of printed images. The same improved results are obtained by an equivalent device.

It is yet another object of the present invention to provide a method and a device which can represent halftone images by using a tone curve that takes into account actual lightness generated by the printing device.

In order to achieve the above object according to the present invention, the method described above further includes a step of defining the plurality of tone curves such that white is equal to lightness of paper used for printing, and black is equal to lightness of black printed by the printer.

In this method, the plurality of tone curves are defined based on lightness of actual print, rather than based on ideal conditions assuming a lightness of 100 for white and a lightness of 0 for black. This achieves a high quality of printed images. The same improved results are obtained by an equivalent device.

Other objects and further features of the present invention will be apparent from the following detailed description when read in conjunction with the accompanying drawings.

DESCRIPTION OF THE PREFERRED EMBODIMENTS

In the following, an embodiment of the present invention will be described with reference to the accompanying drawings.

Figure 1:
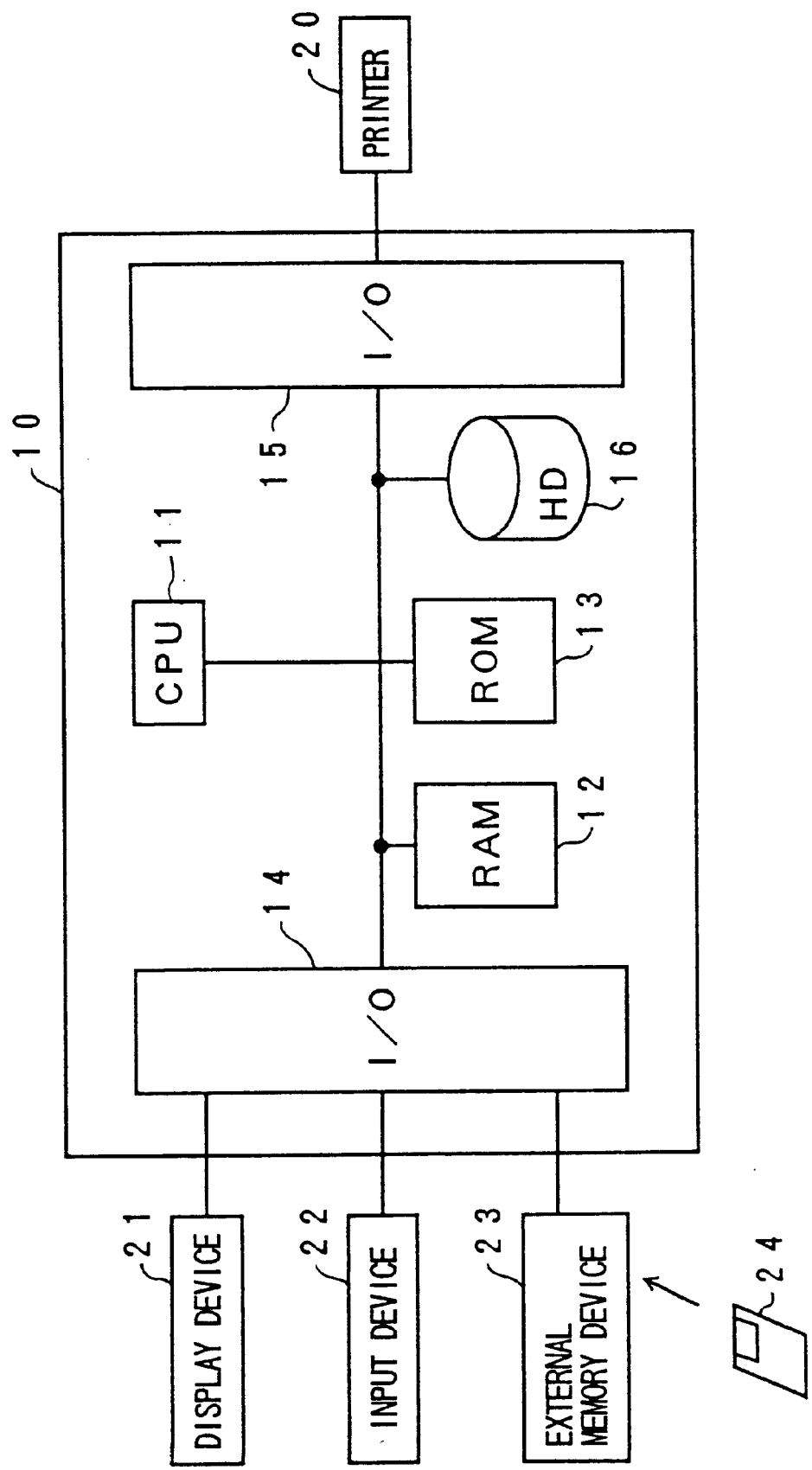
FIG. 1 is a block diagram of an embodiment of a printing device according to the present invention.

FIG. 1 is a block diagram of an embodiment of a printing device according to the present invention. The embodiment of FIG. 1 takes an example of a printer connected to a personal computer. However, the present invention is not limited to this configuration, and is applicable to any printing devices which employ area-based halftone representation based on formation of dots.

The printing device of FIG. 1 includes a personal computer 10 and a printer 20 connected to the personal computer 10.

The personal computer 10 includes a CPU 11, a RAM 12, a ROM 13, interfaces 14 and 15, and a secondary memory 16. The personal computer 10 is connected to a display device 21, an input device 22, and an external memory device 23 via the interface 14. The display device 21 displays various sorts of data when the personal computer 10 is operated, and includes a CRT display or the like. The input device 22 receives input data for operating the personal computer 10, and includes a keyboard and a mouse or the like. The external memory device 23 reads data from a memory medium 24 to feed the data to the personal computer 10, and writes data from the personal computer 10 in the memory medium 24. The printer 20 is connected to the interface 15.

The printer 20 receives image data from the personal computer 10, and forms dots to represent the image data in halftone through area-based halftone representation. The printer 20 is controlled by a printer driver which is built in the personal computer 10.

In the personal computer 10, software programs such as the printer driver and application programs are executed by the CPU 11. The CPU 11 executes the printer driver to control the printer 20 via the interface 15, and further controls the display device 21, the input device 22, and the external memory device 23 by using other control programs.

The memory medium 24 provides software programs such as the printer driver and application programs, and includes a floppy disk, CD-ROM, or the like. The software programs are stored in the secondary memory 16 from the memory medium 24 via the external memory device 23. Programs stored in the secondary memory 16 are loaded into a memory space of the RAM 12, and are executed by the CPU 11. The ROM 13 stores basic programs or the like for controlling the personal computer 10.

In the embodiment of the present invention, the printer driver for controlling the printer 20 includes data of a plurality of tone curves which take into account characteristics of the printer 20. When image data is printed, the CPU 11 selects an appropriate tone curve from the plurality of tone curves based on the characteristics of the image data. The printer driver controls the printer 20 to print the image data by using the selected tone curve.

Figure 2:
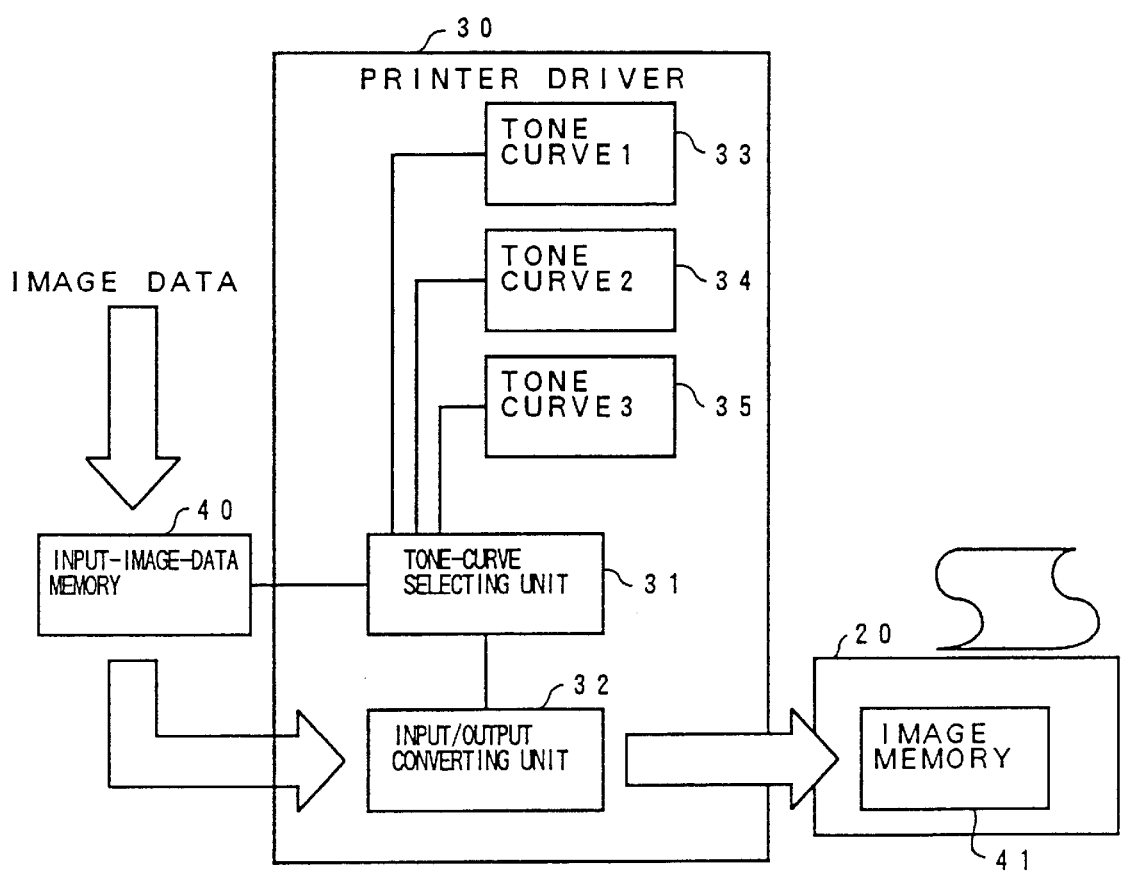
FIG. 2 is a block diagram showing control functions which are used when printing image data by using the personal computer and the printer of FIG. 1.

FIG. 2 is a block diagram showing control functions which are used when printing the image data by using the personal computer 10 and the printer 20.

A printer driver 30 of FIG. 2 includes a tone-curve selecting unit 31, an input/output converting unit 32, and a plurality of tone curves 33 through 35. Although three tone curves are provided in this example, any number of tone curves may be provided in the present invention. The tone-curve selecting unit 31 selects one tone curve from the tone curves 33 through 35 based on the image data stored in an input-image-data memory 40, for example, which corresponds to the RAM 12 of FIG. 1. By using the selected tone curve, the input/output converting unit 32 converts the image data from the input-image-data memory 40. The input/output converting unit 32 supplies the converted image data to an image memory 41 of the printer 20. The printer 20 prints the converted image data stored in the image memory 41. The tone curves 33 through 35 re generated by taking into account printing characteristics of the printer 20. In detail, they are generated by factoring in a ratio of a dot diameter to a dot pitch of the printer 20, actually printed lightness, etc.

In this manner, the present invention prepares the plurality of tone curves taking into consideration the printing characteristics of the printer, and selects one of the tone curves based on the characteristics of the image data to be printed. This achieves optimum halftone representation which takes into account the printing characteristics of the printer as well as the characteristics of the image data, thereby providing high quality of printing.

In what follows, a method of creating a plurality of tone curves which take into account the characteristics of the printer 20 will be described. Printing of monochrome image data is taken as an example for the sake of simplicity of explanation, and each pixel of the image data is assumed to have one of the 256 different levels ranging from 0 to 255.

A relationship between an area ratio and the number of printed dots needs to be obtained in order to decide how many dots should be formed to achieve a given area ratio. As previously described, the ratio of the dot diameter to the dot pitch is not one, and, also, printed dots overlap with each other. Because of this, the relationship between the area ratio and the number of printed dots cannot be obtained as a simple formulae. In consideration of this, a computer simulation was conducted to represent 64 different tones by using an 8-by-8 matrix, and areas covered by printed dots within a matrix were counted.

In order to count the areas, one dot interval is divided into micro blocks arranged in a 80-by-80 matrix. That is, the 8-by-8 matrix is divided into 8×8×80×80 of micro blocks. When the dot diameter is equal to the dot pitch, for example, creation of one dot will result in a circle having a diameter of 80 micro blocks. By counting the number of micro blocks covered by the printed dots, the printed area is measured. A given micro block may be printed more than once because of overlapping of the dots. Even in such a case, however, the area ratio can be measured without overcounting the overlapping dots. That is, the number of micro blocks covered by the printed dots are counted based on whether or not given blocks are covered, irrespective of how many times the given blocks are covered by the printed dots.

In this simulation, 64 different tones were represented, and the number of micro blocks covered by the printed dots was counted with respect to each tone. The area ratio was obtained with respect to each tone as (the number of covered micro blocks/the number of total micro blocks within the matrix).

Figure 3:
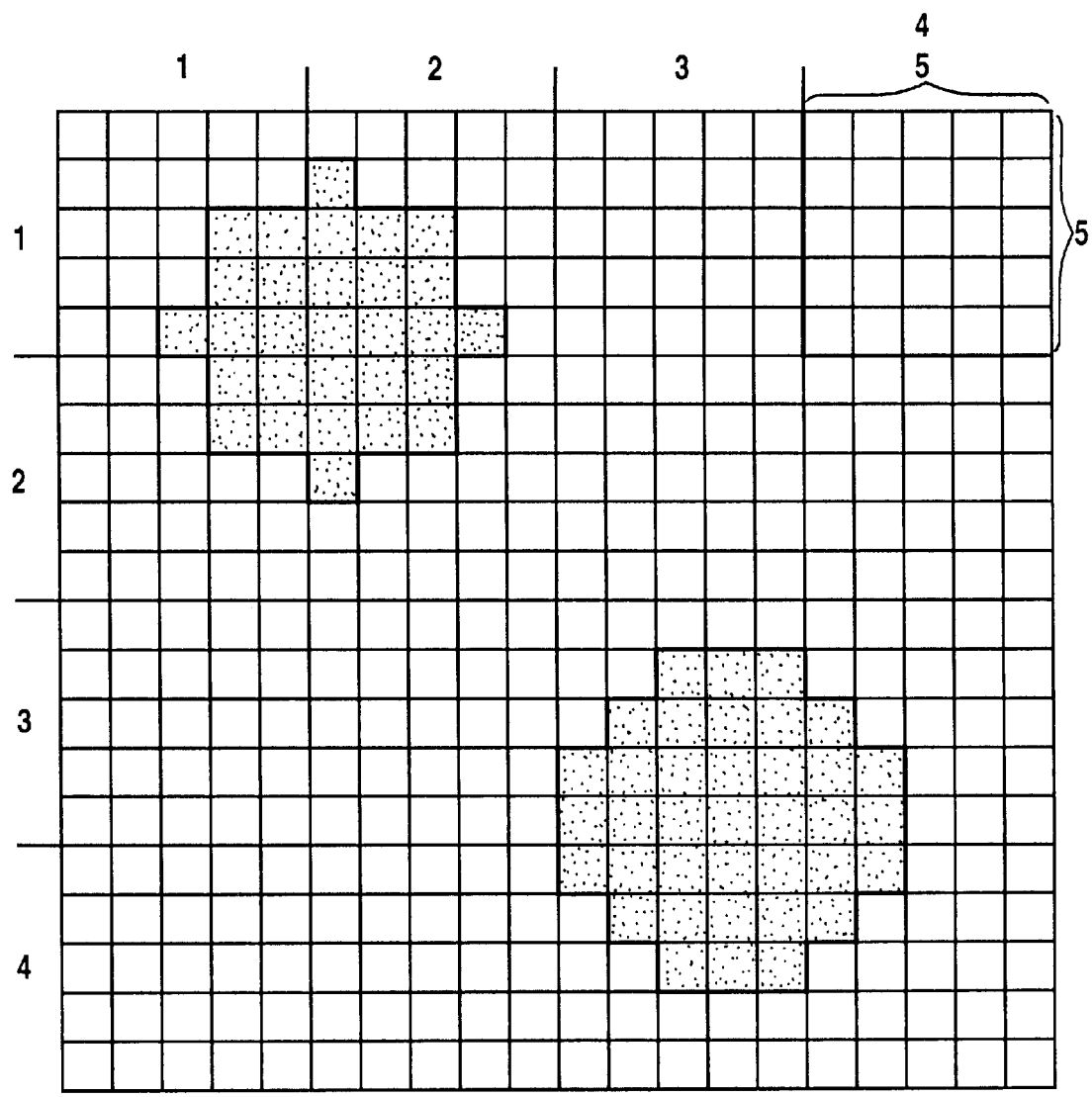
FIG. 3 is an illustrative drawing for explaining an area ratio.

FIG. 3 is an illustrative drawing for explaining the area ratio. FIG. 3 shows a case in which one dot pitch in a 4-by-4 matrix is comprised of 5-by-5 micro blocks. In FIG. 3, two dots are formed. In this example, each of the dots has a circular shape having a diameter of 7 (=1.4×5) micro blocks. In FIG. 3, the number of micro blocks covered by the two dots are 66, and, thus, the area ratio is obtained as 0.165 (=66/(20×20)).

Figure 4:
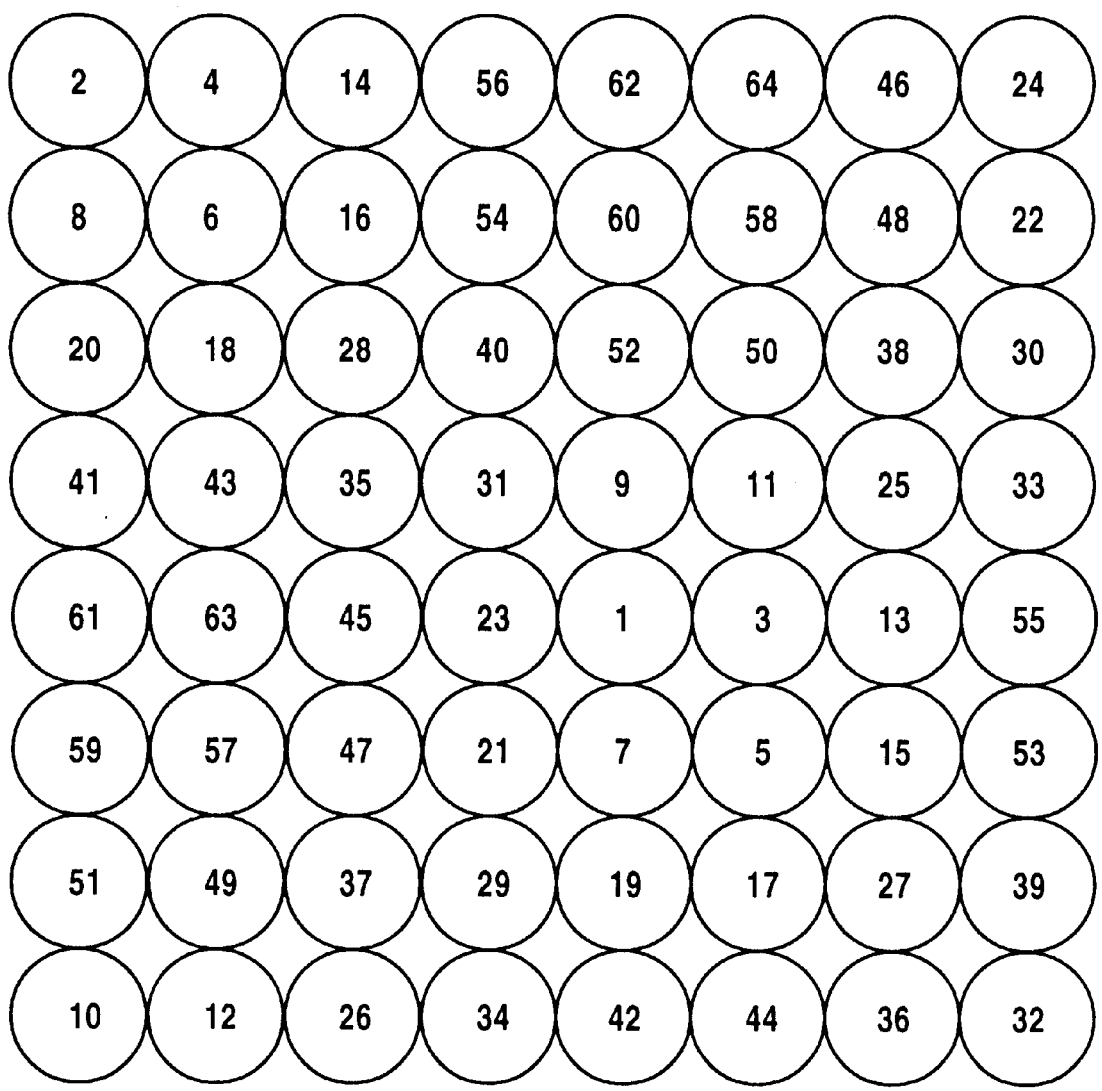
FIG. 4 is an illustrative drawing showing a dither matrix which defines an order of a dot arrangement.

In this simulation, a concentrated dither matrix of a 106-line-45° type was used for defining an order in which dots were printed. FIG. 4 is an illustrative drawing showing this dither matrix which defines the order of the dot arrangement. As a tone changes from a whiter side to a blacker side by one tone, a new dot is created in an order shown in FIG. 4. Since the order of the dot arrangement affects the overlapping of the dots, an order in which dots are printed should be decided beforehand as described above.

The computer simulation was conducted with respect to different parameter values by using (dot diameter/dot pitch) as a parameter. This parameter was set to range between 1 and 2. That is, considered cases included a case in which the dot diameter was equal to the dot pitch at one extreme and a case in which the dot diameter was twice as large as the dot pitch at the other extreme, and included several intervening cases.

Results of the simulation were plotted as a relation between the area ratio and the number of dots, and a second-order regression curve was fitted to obtain the following approximations.

| Dot Diameter | Approximation | |
|---|---|---|
| 2.0 | $a = -1.7947 \times 10^{-4} X^2 + 2.6290 \times 10^{-2} X + 5.4931 \times 10^{-2}$ | (1) |
| 1.8 | $a = -1.4188 \times 10^{-4} X^2 + 2.4274 \times 10^{-2} X + 3.5532 \times 10^{-2}$ | (2) |
| 1.7 | $a = -1.2262 \times 10^{-4} X^2 + 2.3195 \times 10^{-2} X + 2.7355 \times 10^{-2}$ | (3) |
| 1.6 | $a = -1.0256 \times 10^{-4} X^2 + 2.2038 \times 10^{-2} X + 2.0069 \times 10^{-2}$ | (4) |
| 1.4 | $a = -5.9065 \times 10^{-5} X^2 + 1.9389 \times 10^{-2} X + 9.0917 \times 10^{-3}$ | (5) |
| 1.2 | $a = -1.9519 \times 10^{-5} X^2 + 1.6069 \times 10^{-2} X + 3.0519 \times 10^{-3}$ | (6) |
| 1.0 | $a = -3.4833 \times 10^{-8} X^2 + 1.2247 \times 10^{-2} X + 6.8384 \times 10^{-6}$ | (7) |

In these approximations, X indicates the number of the dots (from 1 to 64), and a indicates the area ratio. For example, the area ratio when the number of the dots is 10 is obtained by substituting 10 into X in the above approximations. When the dot diameter of the printer 20 is 1.4 dot pitches, for example, the approximation for the dot diameter of 1.4 is used.

In the manner as described above, the relationship between the area ratio and the number of printed dots is obtained.

In what follows, a relationship between the area ratio and lightness L* will be obtained. This relationship can be derived from the Yule-Nielsen formulae. The Yule-Nielsen formulae is represented as:

$$ODs = -n \, \text{Log}\{1 - a(1 - 10^{-(ODs/n)})\} \quad (8)$$

where, $$L = 116(Y/Y0)^{1/3} - 16 \quad (9)$$

$$ODs = -\text{Log}(Y/Y0) \quad (10)$$

wherein L is lightness, a is the area ratio, n is a Yule-Nielsen coefficient, and ODs is a maximum density. Y is a measured Y value, and Y0 is a base value of the Y value.

From the equation (8), (9), and (10), $$(L+16)/116^{3/n} = 1 - a(1 - 10^{-(ODs/n)}) \quad (11)$$

is obtained. Solving this equation with respect to the area ratio a, $$a = \{1 - (L+16)/116^{3/n}\}/(1 - 10^{-(ODs/n)}) \quad (12)$$

is obtained. In the embodiment, the Yule-Nielsen coefficient is set to 2.7, and the maximum density ODs is 1.4.

The equation (12) gives a relation between the area ratio a and the lightness L, and becomes zero when the lightness L is 100. As previously noted, however, a white sheet of paper used in printing has a lightness of approximately 90, which is smaller than the ideal lightness of 100. In consideration of this, 116 in the equation (12) is replaced by (LW+16) in order to have a zero area ratio at the lightness of white paper LW. This achieves a condition in which the number of printed dots is zero when the lightness of white paper LW is required. After this replacement, a relation between the area ratio a and the lightness L is obtained as:

$$a = \{1-(L+16)/(LW+16)^{3/n}\}/(1-10^{-(ODs/n)}) \quad (13)$$

When the lightness of white paper LW is 90, (LW+16) equals to 106. According to the equation (13), therefore, the area ratio a is zero, i.e., the number of formed dots is zero, when the lightness L of 90 is required.

It is assumed that the area ratio a is 1.0 with respect to the darkest black regardless of an actual lightness L of the printed black. This is because it is necessary to prevent white dots from appearing due to the absence of black dots when the printed area is supposed to be completely black.

In this manner, a relation between the area ratio and the lightness is established such that the area ratio becomes zero when the lightness of the white paper is required, and the area ratio becomes 1.0 when the maximum density is required.

The relation between the area ratio and the number of printed dots as well as the relation between the area ratio and the lightness are used for obtaining a relation between the number of printed dots and the lightness. This gives an answer to how may dots need to be created when a given lightness is required.

A relation between a desired lightness and an image-data level is provided as a tone curve which defines a lightness that should be allocated to a given level of image data. In order to realize level-to-lightness conversion characteristics specified by the tone curve, an appropriate number of dots should be printed in view of a given level of image data so as to achieve a desired lightness. Since the relation between the lightness and the number of printed dots is already known as described above, an appropriate dither matrix can be created to print an appropriate number of dots with respect to a given level of image data. Namely, this dither matrix achieves the level-to-lightness conversion characteristics of the tone curve.

Figure 5:
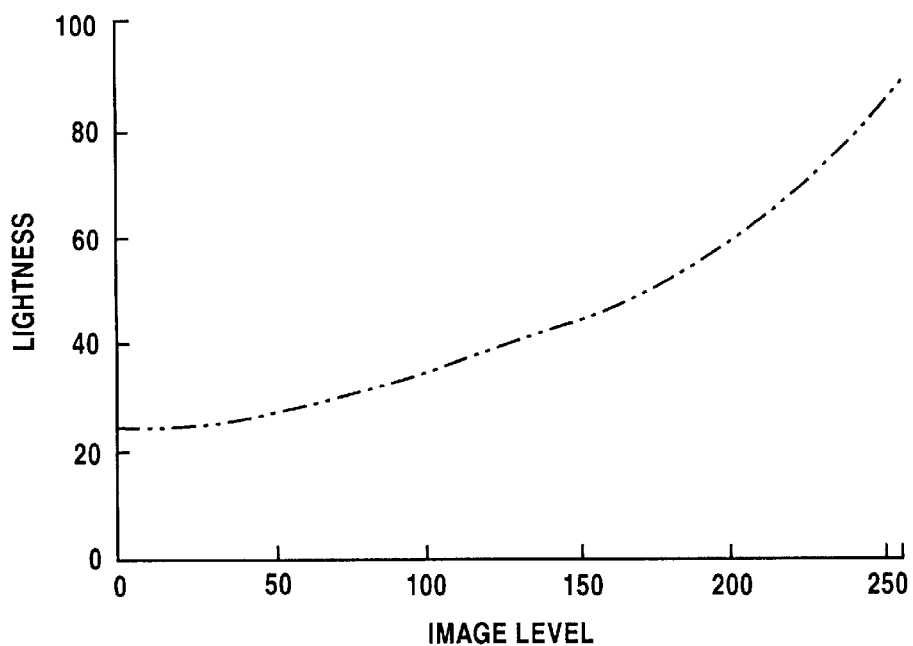
FIG. 5 is a chart showing an example of a tone curve.

FIG. 5 is a chart showing an example of a tone curve. A dither matrix matching the tone curve of FIG. 5 is created as follows. First, the image levels ranging from 0 to 255 are converted into 64 image levels between 0 and 63, and, then, a lightness is obtained with respect to each image level by using the tone curve. Next, an area ratio which is needed to achieve the obtained lightness is derived by using the equation (13). Finally, the number of printed dots which attains the obtained area ratio is obtained by using one of the equations (1) through (7). In this manner, it is decided as to how may dots need to be formed with respect to each level of the 64 image levels. That is, an 8-by-8 dither matrix corresponding to the tone curve of FIG. 5 is obtained.

A 16-by-16 dither matrix may be created by dividing each interval between the threshold values of the 8-by-8 matrix into four equal intervals. It is apparent, however, that equations corresponding to the equations (1) through (7) can be prepared with regard to a 16-by-16 matrix. In this manner, a 16-by-16 dither matrix can be directly obtained without deriving an 8-by-8 dither matrix as an intermediary.

As described above, a dither matrix which matches a desired tone curve is obtained by taking into consideration a ratio between the dot diameter and the dot pitch in a printer as well as an actual printed density of the printer.

Figure 6:
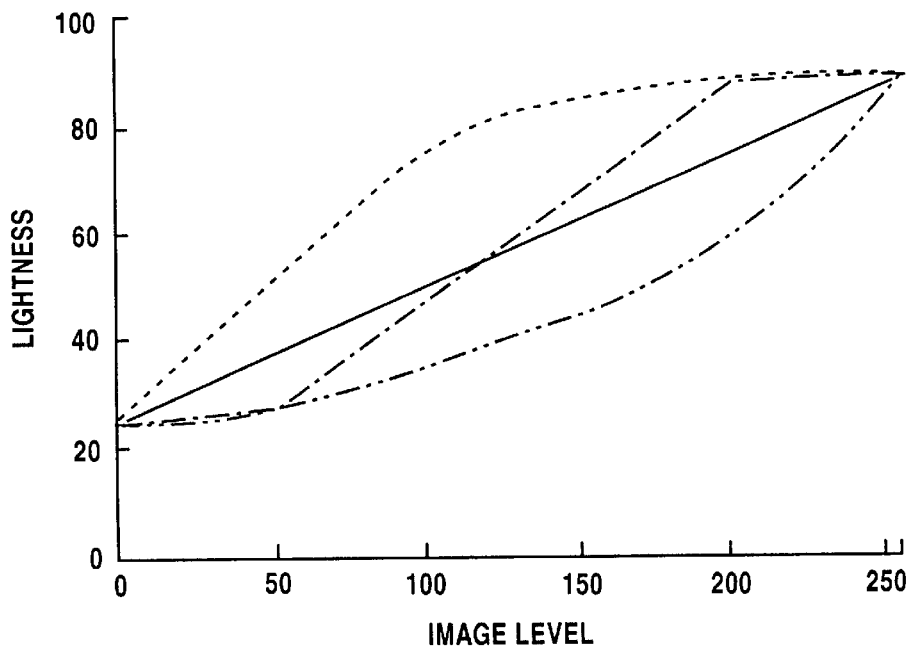
FIG. 6 is a chart showing a plurality of tone curves used in the embodiment of the present invention.

FIG. 6 is a chart showing a plurality of tone curves used in the embodiment of the present invention. As shown in an example of FIG. 6, four tone curves are provided for four different images, which include a general image, a dark image, an intermediate image, and a bright image. In order to decide which tone curve is to be used, a check is made whether a given pixel of image data belongs to a dark-level region, an intermediate-level region, or a bright-level region, which divide the levels between 0 and 255 into three regions. The decision is made based on a balance between the numbers of pixels in the three regions. The dark-level region, the intermediate-level region, and the bright-level region range from 0 to 85, from 86 to 170, and from 171 to 255, for example.

Figure 7:
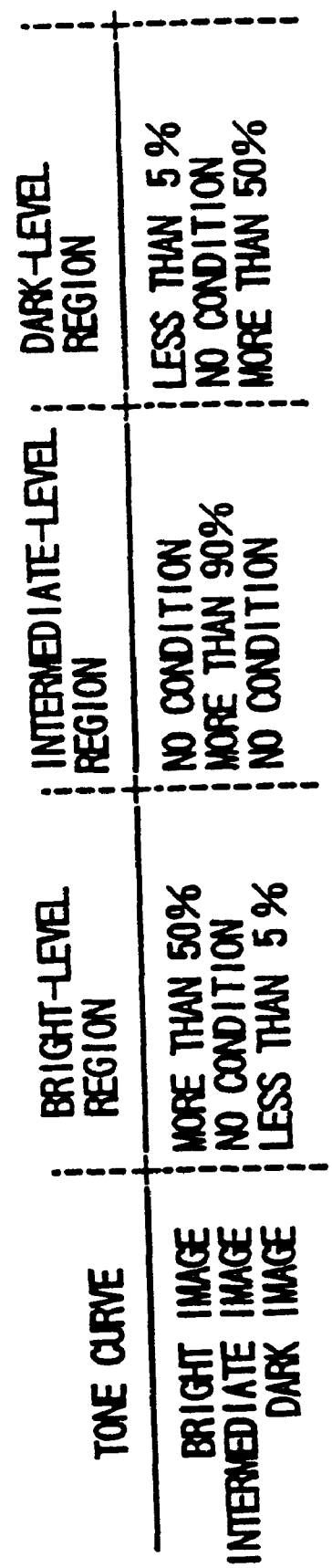
FIG. 7 is a table showing an example of criteria used for selecting a tone curve.

FIG. 7 is a table showing an example of criteria used for selecting a tone curve. All pixels of an image are checked as to what levels they are. If pixels in the bright-level region account for 60% of the total and those in the dark-level region account for 3%, for example, a tone curve for a bright image is selected. When the distribution of pixel levels does not match any one of conditions shown in FIG. 7, a tone curve for a general image is selected.

Figure 8:
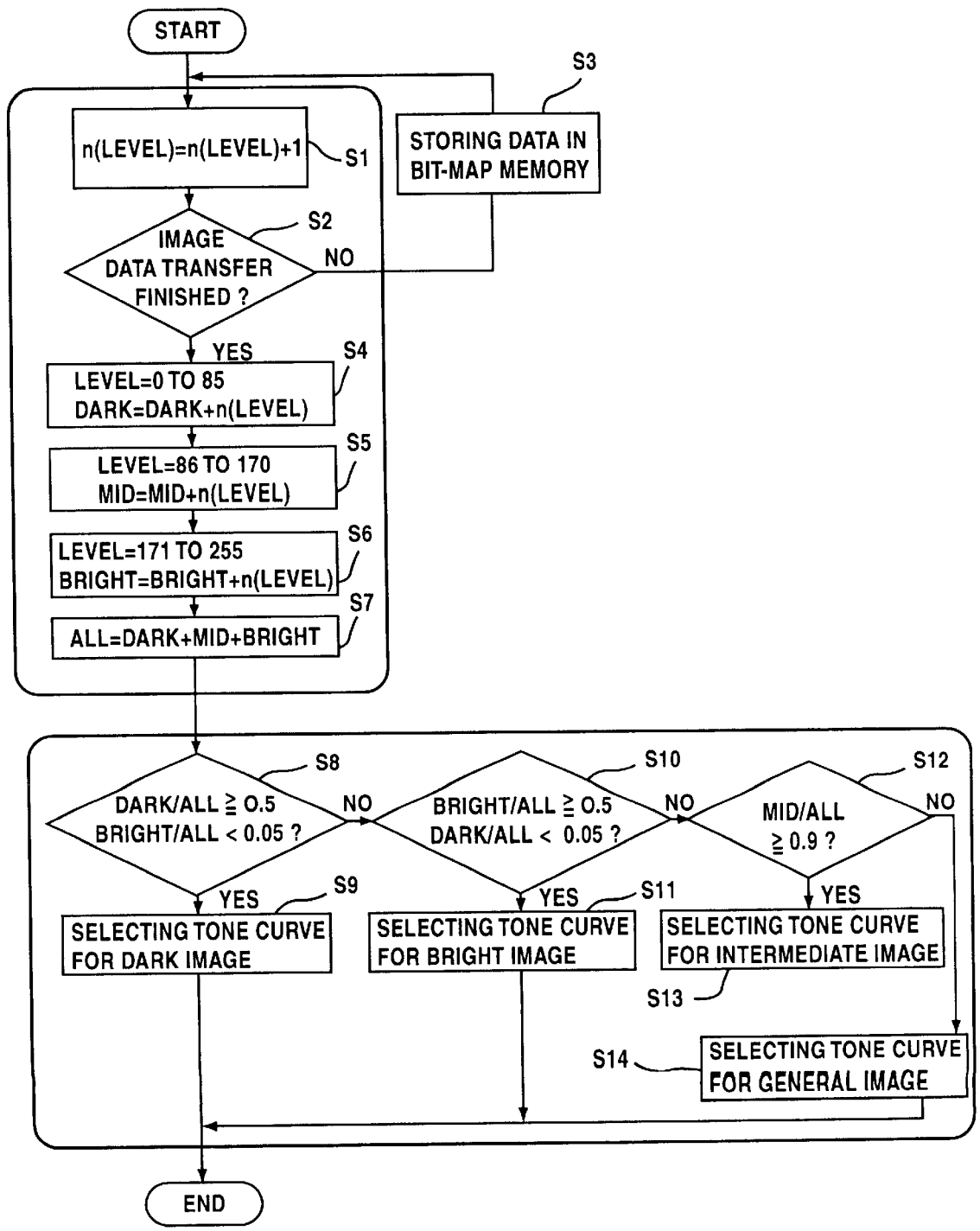
FIG. 8 is a flowchart of a process of selecting a tone curve in which selection criteria of FIG. 7 are used.

FIG. 8 is a flowchart of a process of selecting a tone curve in which the selection criteria shown in FIG. 7 are used.

At a step S1, a level of a pixel stored in a bitmap memory is checked, and a count of this level is incremented by 1.

At a step S2, a check is made whether the writing of image data into the bitmap memory is finished. If it is, the procedure goes to a step S4. Otherwise, the procedure goes to a step S3.

At a step S3, a next pixel is stored in the bitmap memory. The procedure goes back to the step S1.

At a step S4, a sum of counts is obtained with respect to levels between 0 and 85. This sum is denoted as "dark". That is, the number of pixels which belong to the dark-level region is obtained as "dark".

At a step S5, a sum of counts is obtained with respect to levels between 86 and 170. This sum is denoted as "mid". That is, the number of pixels which belong to the intermediate-level region is obtained as "mid".

At a step S6, a sum of counts is obtained with respect to levels between 171 and 245. This sum is denoted as "bright". That is, the number of pixels which belong to the bright-level region is obtained as "bright".

At a step S7, the sum of "dark", "mid", and "bright" is calculated to obtain the total number of pixels, which is denoted as "all".

At a step S8, a check is made whether the number of pixels in the dark-level region exceeds 50% of the total (dark/all≧0.5) and the number of pixels in the bright-level region falls short of 5% of the total (bright/all<0.05). If the answer is affirmative, the procedure goes to a step S9. Otherwise, the procedure goes to a step S10.

At a step S9, a tone curve for a dark image is selected from the plurality of tone curves.

At a step S10, a check is made whether the number of pixels in the bright-level region exceeds 50% of the total (bright/all≧0.5) and the number of pixels in the dark-level region falls short of 5% of the total (dark/all<0.05). If the answer is affirmative, the procedure goes to a step S11. Otherwise, the procedure goes to a step S12.

At a step S11, a tone curve for a bright image is selected from the plurality of tone curves.

At a step S12, a check is made whether the number of pixels in the intermediate-level region exceeds 90% of the total (mid/all≧0.9). If it does, the procedure goes to a step S13. Otherwise, the procedure goes to a step S14.

At the step S13, a tone curve for an intermediate image is selected from the plurality of tone curves.

At a step S14, a tone curve for a general image is selected from the plurality of tone curves. This ends the procedure.

As described in the above, the present invention provides a plurality of tone curves which are tailored for different images of different characteristics, and creates dither matrixes for these tone curves by taking into account a ratio between the dot diameter and the dot pitch of the printer as well as actual printed densities of the printer. At the time of printing, image characteristics are checked to select an appropriate tone curve from the plurality of tone curves, and image data is printed by using the selected tone curve. This makes it possible to achieve optimum halftone representation which takes into account the image characteristics of the image data and the printing characteristics of the printer, thereby producing a high-quality print.

Further, the present invention is not limited to these embodiments, but various variations and modifications may be made without departing from the scope of the present invention.

What is claimed is:

1. A method of achieving halftone representation of image data by using a printer for printing said image data, said method comprising the steps of:

a) obtaining a plurality of tone curves by determining how many dots are printed with respect to each image level based on a relation between area ratios and numbers of printed dots so as to achieve a desired area ratio for each image level, the relation being obtained by taking into account overlapping of printed dots and an area ratio being a ratio of an area size occupied by the printed dots to a unit area of the halftone representation;

b) selecting a tone curve from said plurality of tone curves; and c) printing said image data by using said tone curve.

2. The method as claimed in claim 1, wherein said step b) comprises a step of selecting said tone curve from said plurality of tone curves based on characteristics of said image data.

3. The method as claimed in claim 2, wherein said step b) comprises the steps of:

obtaining a distribution of levels of said image data; and selecting said tone curve from said plurality of tone curves based on how much percentage at least one predetermined range of levels accounts for in said distribution of levels.

4. The method as claimed in claim 1, wherein the desired area ratio for each image level is determined by taking into account printed lightness achieved by said printer.

5. The method as claimed in claim 4, wherein said step a) further comprises a step of defining said plurality of tone curves such that white is equal to lightness of paper used for printing, and black is equal to lightness of black printed by said printer.

6. A computer usable medium tangibly embodying a program of instructions executable by a machine to perform method steps for achieving halftone representation of image data by using a printer for printing said image data, said method steps comprising:

a) obtaining a plurality of tone curves by determining how many dots are printed with respect to each image level based on a relation between area ratios and numbers of printed dots so as to achieve a desired area ratio for each image level, the relation being obtained by taking into account overlapping of printed dots and an area ratio being a ratio of an area size occupied by the printed dots to a unit area of the halftone representation;

b) selecting a tone curve from said plurality of tone curves; and c) printing said image data by using said tone curve.

7. The computer usable medium as claimed in claim 6, wherein said step b) comprises a step of selecting said tone curve from said plurality of tone curves based on characteristics of said image data.

8. The computer usable medium as claimed in claim 7, wherein said step b) comprises the steps of:

obtaining a distribution of levels of said image data; and selecting said tone curve from said plurality of tone curves based on how much percentage at least one predetermined range of levels accounts for in said distribution of levels.

9. The computer usable medium as claimed in claim 6, wherein the desired area ratio for each image level is determined by taking into account printed lightness achieved by said printer.

10. The computer usable medium as claimed in claim 9, wherein said step a) further comprises a step of defining said plurality of tone curves such that white is equal to lightness of paper used for printing, and black is equal to lightness of black printed by said printer.

11. A device for printing image data by using halftone representation, said device comprising:

storage means for storing a plurality of tone curves obtained by determining how many dots are printed with respect to each image level based on a relation between area ratios and numbers of printed dots so as to achieve a desired area ratio for each image level, the relation being obtained by taking into account overlapping of printed dots and an area ratio being a ratio of an area size occupied by the printed dots to a unit area of the halftone representation;

selection means for selecting a tone curve from said plurality of tone curves; and control means for printing said image data by using said tone curve.

12. The device as claimed in claim 11, wherein said selection means comprises means for selecting said tone curve from said plurality of tone curves based on characteristics of said image data.

13. The device as claimed in claim 12, wherein said selection means comprises:

means for obtaining a distribution of levels of said image data; and means for selecting said tone curve from said plurality of tone curves based on how much percentage at least one predetermined range of levels accounts for in said distribution of levels.

14. The device as claimed in claim 11, wherein the desired area ratio for each image level is determined by taking into account printed lightness achieved by said device.

15. The device as claimed in claim 14, wherein said storage means further comprises means for defining said plurality of tone curves such that white is equal to lightness of paper used for printing, and black is equal to lightness of black printed by said device.

* * * * *